United States Patent [19]
Devino

[11] Patent Number: 4,656,512
[45] Date of Patent: Apr. 7, 1987

[54] MULTIPLE AUDIO TRANSMISSION SYSTEM USING A SINGLE VIDEO COLOR CARRIER

[75] Inventor: Steven Devino, Derry, N.H.

[73] Assignee: Grumman Aerospace Corporation, Bethpage, N.Y.

[21] Appl. No.: 734,514

[22] Filed: May 16, 1985

[51] Int. Cl.<sup>4</sup> ............................................. H04N 7/04
[52] U.S. Cl. ....................................... 358/143; 358/82
[58] Field of Search ................. 358/143, 144, 142, 12, 358/82; 84/198, 115; 381/1, 2; 370/11, 69; 360/8, 32, 19.1

[56] References Cited

U.S. PATENT DOCUMENTS

| | | | |
|---|---|---|---|
| 2,468,038 | 5/1986 | Clavier | 332/19 |
| 2,824,908 | 5/1986 | Palmer | 370/11 |
| 3,221,098 | 5/1986 | Feldman et al. | 358/198 |
| 3,789,137 | 1/1974 | Newell | 360/8 |
| 4,081,829 | 3/1978 | Brown | 358/82 |
| 4,167,979 | 9/1979 | Liebler et al. | 358/82 |
| 4,267,561 | 5/1981 | Karpinsky et al. | 358/82 |
| 4,419,920 | 12/1983 | Ohe | 358/143 X |

Primary Examiner—Howard W. Britton
Assistant Examiner—Victor R. Kostak
Attorney, Agent, or Firm—Pollock, Vande Sande & Priddy

[57] ABSTRACT

A video system in which the conventional picture portion occurring during a single horizontal line is entirely replaced by multiple audio channels using a single carrier. A transmitter includes means for encoding the audio channels with conventional video red, green and blue signals, while a receiver decodes the video signals to reconstruct the multiple audio channels.

5 Claims, 12 Drawing Figures

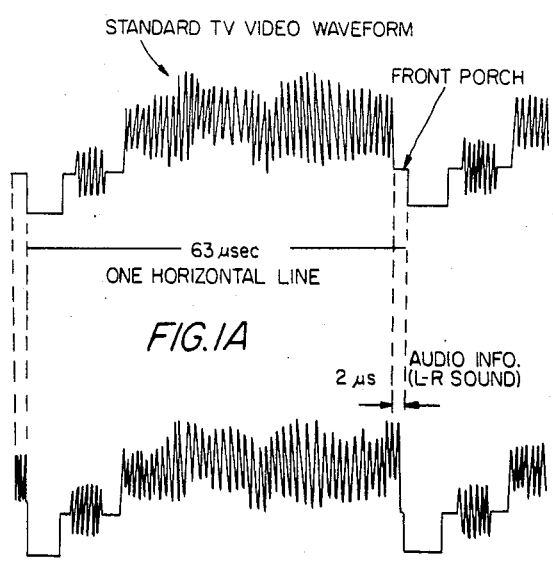
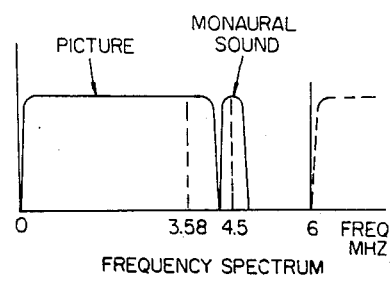
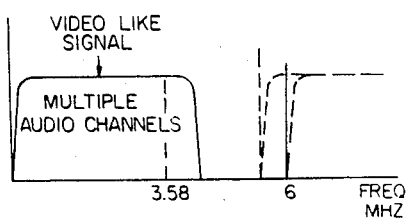
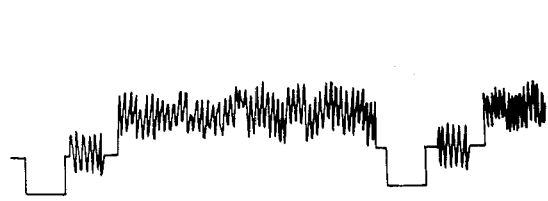
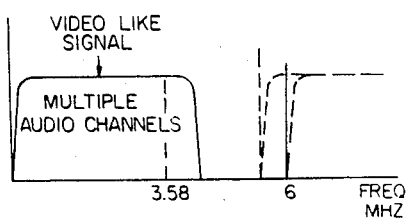

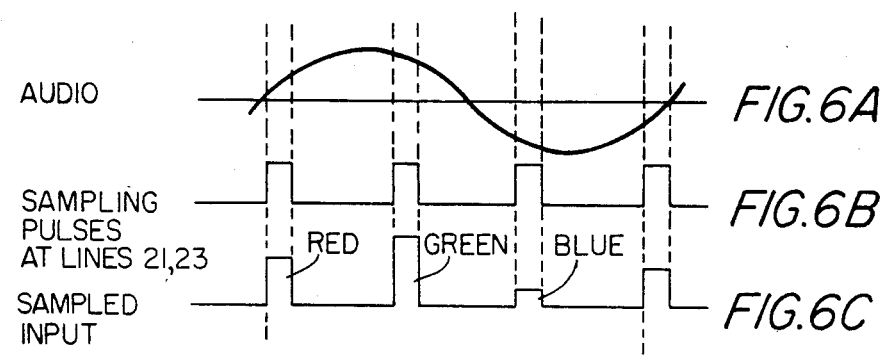

MULTIPLE AUDIO TRANSMISSION SYSTEM USING A SINGLE VIDEO COLOR CARRIER

FIELD OF THE INVENTION

The present invention relates to a video transmission system and more particularly to a color transmission system capable of encoding multiple audio channels in lieu of picture information.

BACKGROUND OF THE INVENTION

In co-pending patent application Ser. No. 748,759, by Berde, et al., and assigned to the present assignee, an audio signal may be inserted into a composite video signal by synchronizing three evenly spaced samples of the audio signal with each horizontal sync pulse in the video signal. Insertion of the three audio samples at the end of each horizontal line in the video signal is accomplished by first converting the audio samples to red, green and blue video samples. Since the converted audio samples are inserted only at the end of each video horizontal line, the "picture" portion of the video is unaffected by such addition of a second audio channel.

BRIEF DESCRIPTION OF THE PRESENT INVENTION

The present invention is a patentable extension of the referenced prior art. The picture information of a transmitted signal is completely replaced with multiple audio channels. The multiple audio channels undergo time compression sampling by tapped analog delay lines which generate red, green and blue compressed sampling signals for each audio input. Analog MUXs switch the samples to a color encoder which is connected at its output to video circuits for creating an encoded video signal which has the normal picture information completely replaced by the multiple audio input data. The video encoded audio data is then transmitted to a remote receiver which is capable of decoding the transmitted information into output signals corresponding to the multiple audio input signals at the transmitter.

A visual comparison of the present invention when compared with the prior art is shown in FIGS. 1A—3B. In FIG. 1A a standard TV video waveform is plotted for a single horizontal line. The corresponding frequency spectrum of such a standard TV video waveform is indicated in FIG. 1B. As indicated, the initial portion of the frequency spectrum is occupied by video information representing a TV picture. The second portion of the frequency spectrum includes a monaural sound channel.

FIG. 2A illustrates the waveform for the system disclosed in the previously mentioned co-pending application. During the two microsecond interval at the end of the horizontal line, audio information is sampled in a manner making these samples appear as red, green and blue video signals. As shown in FIG. 1A, the sampled audio information represents L−R sound from stereo audio inputs to the system. In FIG. 2B the corresponding frequency spectrum is illustrated. As will be noted the L−R sound information is included within the first spectrum portion relating to picture information. The second portion of the spectrum, which is conventionally used for monaural sound in standard TV systems (FIG. 1B), is instead employed for containing L+R audio information. At a specially designed receiver, the L−R and L+R signals are processed to render the picture information along with stereo sound.

The essence of the present invention is illustrated in FIGS. 3A and 3B. As shown in the former figure, the entire video waveform is occupied by adjacent intervals of audio information. It should be understood that there is no picture information within the entire waveform of FIG. 3A. The counterpart frequency spectrum is shown in FIG. 3B wherein the entire initial interval which previously included picture information (FIG. 1B) is now occupied by multiple audio channels.

Inasmuch as the present invention offers a video system for transmitting multiple audio channels using a single video color carrier, the invention has many advantages when compared to known video transmission systems which include multiple audio channels. The known systems require considerable replication and modification of existing network and cable distribution equipment and considerable modification of existing transmitters and are therefore costly in manufacture and costly in implementation.

The principal object of the invention is to provide a color video transmission system with multiple audio channels without modification of existing network and cable distribution equipment.

An object of the invention is to provide a color video transmission system with multiple audio channels without modification of existing transmitters.

Another object of the invention is to provide a color video transmission system with multiple audio channels which utilizes a modified standard system.

Still another object of the invention is to provide a color video transmission system with multiple audio channels in an inexpensive manner.

Yet another object of the invention is to provide a color video transmission system with multiple audio channels which are efficient, effective and which offer wide bandwidth with high fidelity.

BRIEF DESCRIPTION OF THE FIGURES

The above-mentioned objects and advantages of the present invention will be more clearly understood when considered in conjunction with the accompanying drawings, in which:

FIG. 1A is the waveform of a standard TV video signal;

FIG. 1B is the frequency spectrum corresponding to the waveform of FIG. 1A;

FIG. 2A is the waveform of a prior art stereo TV system;

FIG. 2B is the frequency spectrum corresponding to that of FIG. 2A;

FIG. 3A is the waveform of a system operating in accordance with the present invention;

FIG. 3B is the frequency spectrum corresponding to that of FIG. 3A;

FIG. 6A is a plot of a simple sinusoidal audio signal of the type presented at each channel input;

FIG. 6B is a plot of sampling pulses generated in the transmitter portion of the present invention;

FIG. 6C is a plot of the audio input information as sampled.

DETAILED DESCRIPTION OF THE INVENTION

Figures 4A, 4B:
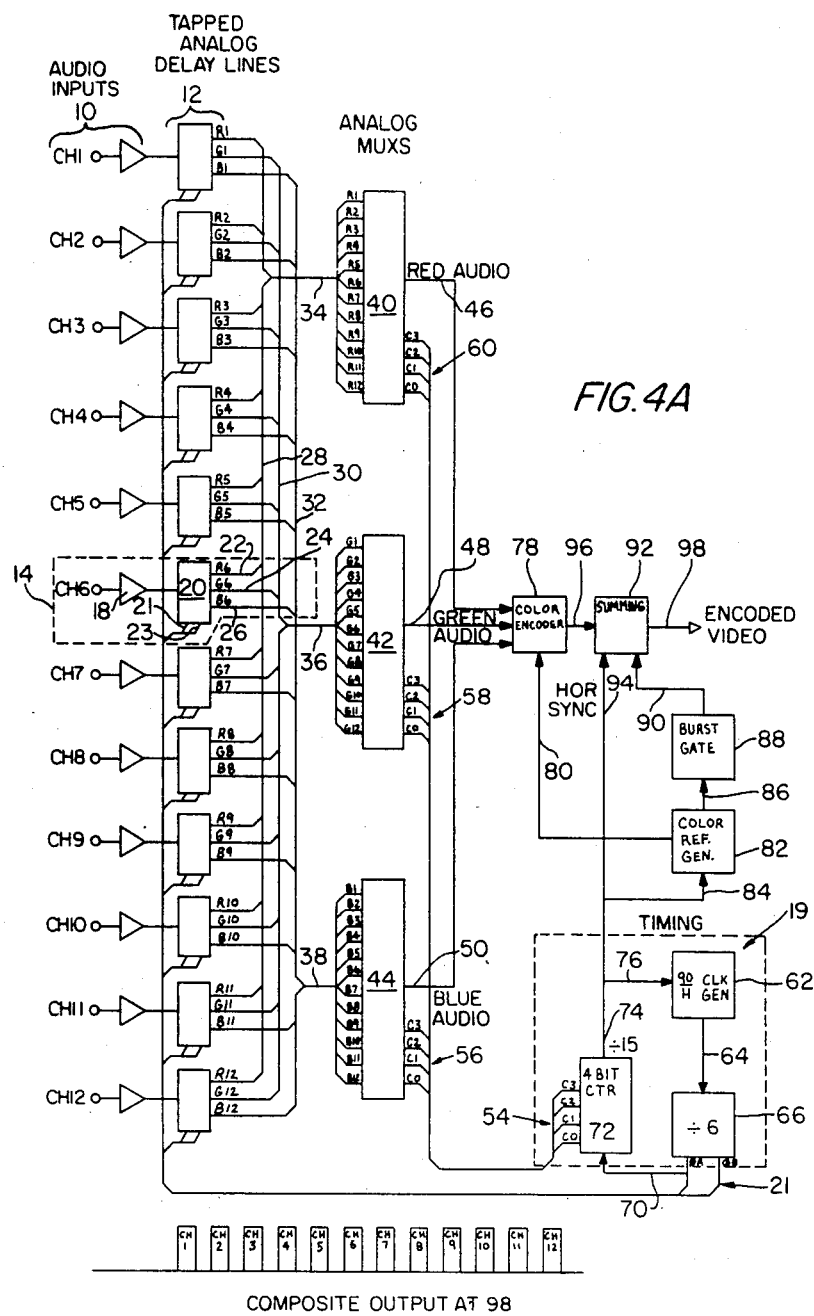
FIG. 4A is a block diagram of the transmitter baseband portion of the present invention.
FIG. 4B is a plot of the composite baseband output of a transmitter portion of the invention.

FIG. 4A is a block diagram of a transmitter baseband portion of the present invention, wherein operation is explained in connection with a 12-channel multiplexed audio encoded video signal, 12 channels merely being by way of example only. As indicated in the figure, the multiple audio inputs are present at 10 and each audio input channel undergoes a respectively increasing delay through tapped analog delay lines 12 which, in the present example, is a 32-stage electronic delay line for providing three time-compressed output signals that represent samples of the audio signal inputs. Considering circuit operation on a single channel, such as channel 6, reference is made to circuit portion 14 which includes an amplifier 18 for conditioning the input signal at audio channel 6 prior to introduction to corresponding delay line stage 20. All of the delay lines 12 are driven by a two-phase clock signal generated by a timing circuit, generally indicated by reference numeral 19, the two-phase clock signal being introduced to all the delay lines via clock input lines 21 and 23.

FIGS. 6A-6C indicate the sampling process by the delay line stage 20. In FIG. 6A an audio signal is shown which represents the signal at the channel 6 input. At FIG. 6B the sampling pulses generated by timing circuit 19 and present at lines 21 and 23 are illustrated. The resultant sampled input is indicated in FIG. 6C and is equivalent to the red, green and blue video signals in a conventional TV transmitter. For the case of channel 6 (FIG. 4A), the red (R6), green (G6) and blue (B6) signals are respectively indicated by references numerals 22, 24 and 26. The individual red signal output lines from delay lines 12 are individually connected along cable 28 to an input 34 of a first analog MUX 40. Similarly, the green signal output lines from the delay lines 12 are cabled at 30 to input 36 of a second analog MUX 42. Finally, the blue signal lines from the delay lines 12 are cabled at 32 and connected to the input 38 of a third analog MUX 44. The multiplexed output 46 from MUX 40 supplies a red video signal which relates to the sampled audio input at channel 6. Similarly, green and blue video signals appear at respective outputs 48 and 50 of corresponding MUXs 42 and 44.

Timing circuit 19 provides the four-bit output at lines generally indicated by reference numeral 54 which are input to four-bit control lines 56, 58 and 60 at corresponding MUXs 44, 42 and 40. The four-bit control enables MUX switching of the twelve indicated inputs at each of the MUX units.

The timing circuit 19 includes a basic clock generator which generates pulses at timing intervals equal to 90/H, wherein H is approximately equal to the period of the horizontal synchronization signal. The output from clock generator 62 is fed to a divide-by-six divider circuit 66 via connecting line 64. The divider 66 has a two-phase output, generally indicated by reference numeral 25, each phase having a signal interval equal to 15/H. Line 70 connects one of the phase outputs from the divider 66 to a four-bit counter 72 having, in the example discussed, a count of 15 pulses at its output 74. This output is fed back, via 76, to the clock generator 62.

Color encoder 78 accepts, at its intput, the red, green and blue video signals, representing the sampled audio inputs from the MUXs. A color reference generator 82, driven at its input 84 by the four-bit counter 72, feeds the color reference signal 80 to the color encoder 78 which presents a color encoded signal at its output 96 for summing, at circuit 92, with horizontal sync signal 94, the latter being generated by the four-bit counter 72, and with further summing from output 90 of burst gate 88 which is connected at its input to the output 86 of color reference generator 82. At the output 98 of summing circuit 92 is an encoded video signal containing the sampled audio information from the 12 channels.

FIG. 4B illustrates the adjacently situated sampled audio pulses from channels 1-12 constituting a composite video output at 98 during one horizontal line of video transmission.

Figure 5:
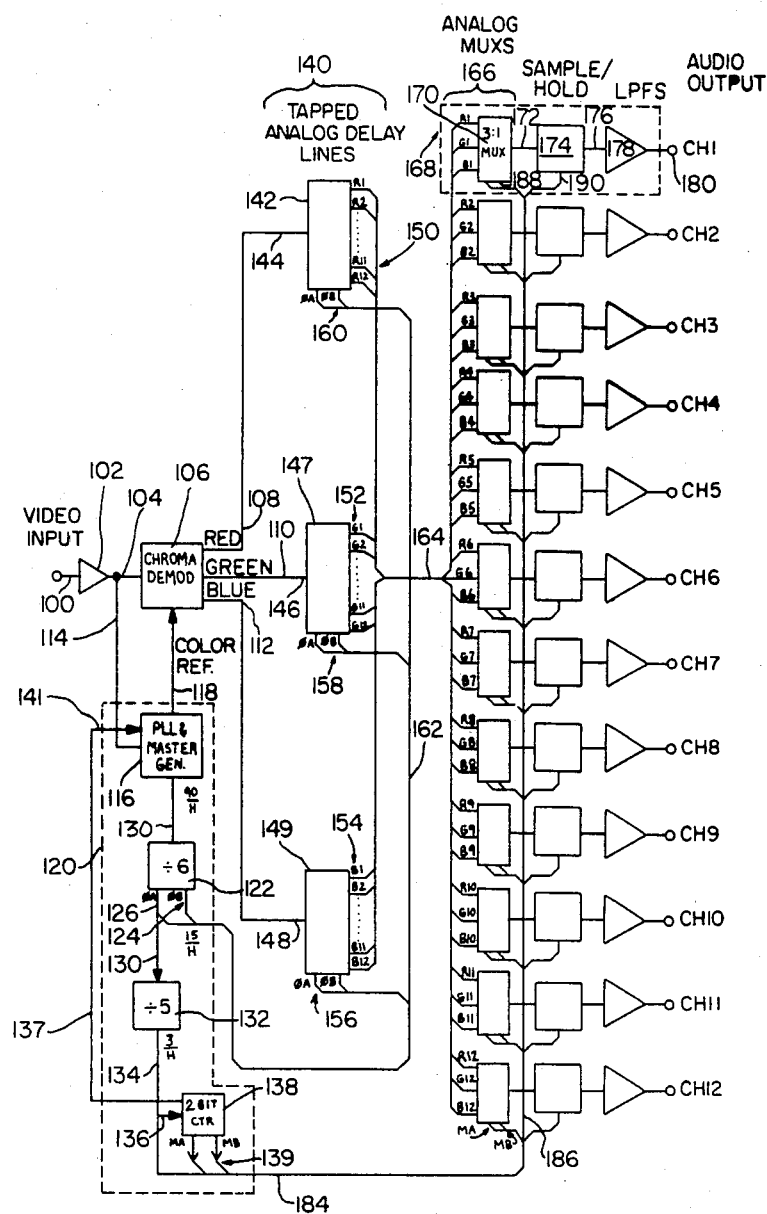
FIG. 5 is a block diagram of the receiver baseband portion of the present invention.

FIG. 5 is a block diagram of the receiver portion of the present system. Composite encoded video for the multiple audio channels is presented at video input 100 where the signal undergoes conditioning by amplifier 102 and is subsequently introduced to the input 104 of a chroma demodulator 106. A color reference is generated along the output 118 of a timing circuit 120 including a phase-locked loop connected to a master generator, collectively indicated at 116. The output from amplifier 102 provides an input along line 114 to the phase-locked loop master generator 116. A divide-by-six divider circuit 122 is driven by the phase-locked loop master generator 116, the latter providing a driving signal equivalent to 90/H which corresponds to the generator 62 of the transmitter (FIG. 4A). The output from the divider circuit 122 is a two-phase signal generally indicated by reference numeral 124 which includes a first phase signal fed from divider output 126 to divide-by-five divider circuit 132 at input 130 thereof. Divider 132 in turn drives the input 136 of a two-bit counter 138. The signal 137 from counter 138 is fed back to the input 141 of phase-locked loop-master generator 116. The output 134 from the divider circuit 132 is equivalent to a control interval equal to 3/H for the example discussed herein.

The demodulator 106 derives individual red, green and blue demodulated video signals which then drive the tapped analog delay line array 140. Specifically, the red video line 108 is connected to the input 144 of delay line 142. Likewise, the green video line 110 is connected to the input 146 of delay line 147, while the blue video signal 112 is fed to input 148 of delay line 149. The analog delay line array expands the red, green and blue audio samples which have been previously compressed as encoded video signals. Thus, the output from delay line 142 constitutes the red signals from each of the audio channels, the output taps from this delay line being generally indicated by reference numeral 150. Similarly, the green signals are presented at output taps 152 of delay line 147. Finally, the blue signals become available at the taps 154 of delay line 149. The red, blue and green signals are sequentially output from the analog delay lines in accordance with the two-phase clock signals presented at inputs 160, 158 and 156 of the delay lines 142, 147 and 149, respectively. As is clearly indicated in the figure, the two-phase lock which drives to the delay lines is supplied via bus 162, which is connected to the output of the two-phase signals from divider 122.

The tapped delay line array 140 is connected to analog MUXs 166 to switch the red, green and blue signals, appearing on bus 164 prior to completely reconstituting the audio information at individual audio output channels. Thus, considering the output for a single audio channel, reference is made to box 168 which illustrates a 3:1 MUX 170 which separately multiplexes the red, green and blue (R, G, B) information to input 172 of the corresponding sample/hold circuit 174. The output from the sample/hold circuit is input at 176 to a low-pass filter 178 just prior to supplying the channel 1 audio output at terminal 180, which corresponds with the audio input channel 1 in the transmitter of FIG. 4A.

MUX 170 is driven by the two-bit count from timing circuit output 184, as shown at reference numeral 188, the count being supplied along bus 186 from the two-bit counter 138. The sample/hold circuit 174 is connected at clock input 190 to the 3/H signal of the divide-by-five divider circuit 132. Similar operation between MUX, sample/hold circuit and low-pass filter occurs for the remaining channels 2-12. The primary purpose of each sample/hold circuit and serially connected low-pass filter is to act as an audio buffer output to condition the audio output and provide proper output impedances and load driving capabilities.

In summary, the present invention offers a multiple audio transmission system using a single video color carrier and operates by replacing the picture information of a standard transmission system with sampled audio information. Demodulation at a receiver demodulates the transmitted composite video signal and reconstructs it as the originally supplied multiple audio channels of information.

It should be understood that the invention is not limited to the exact details of contruction shown and described herein for obvious modifications will occur to persons skilled in the art.

I claim:

1. A single carrier video system for enabling broadcast of multiple input channels, in lieu of picture information as conventionally contained in a TV video waveform, the system comprising:
   means for sampling and time compressing audio input signals from each channel and using the sampled-compressed signals to replace red, green and blue color video signals;
   encoding means connected at its input to the output of the sampling-compressing means for combining the replaced signals to form an encoded composite signal;
   means for demodulating the encoded signal to restore the audio signal samples; and
   means connected at its input to the output of the demodulator means for expanding the samples to resemble the multiple audio input signals.

2. A single carrier video system for enabling broadcast of multiple channels, in lieu of picture information as conventionally contained in a TV video waveform, the system comprising:
   means for sampling and time compressing separate audio input signals and reducing the sampled-compressed signals to correspond to red, green and blue color video signals;
   encoding means connected at its input to the output of the sampling-compressing means for combining the color video signals to form a single encoded video signal;
   means for demodulating the encoded signal to restore the color video signal samples; and
   means connected at its input to the output of the demodulator means for expanding the samples to resemble the audio input signals;
   wherein the sampling-compressing means comprises tapped analog delay lines having inputs thereof connected to each of the multiple channels, output taps of the delay lines carrying compressed samples corresponding to red, green and blue video signals.

3. The structure set forth in claim 2 together with analog MUX means connected between the sampling-compressing means and the encoding means for simultaneously providing red, green and blue samples from the multiple channels to the encoding means.

4. A single carrier video system transmitting circuit enabling broadcast of multiple audio channels in lieu of picture information as conventionally contained in a TV video waveform, the circuit comprising:
   tapped analog delay lines having inputs thereof connected to each of the multiple channels, output taps of the delay lines carrying compressed samples of the input channels and resembling red, green and blue video signals;
   analog MUX means connected between the tapped analog delay lines and the encoding means for simultaneously providing the red, green and blue samples from the multiple input channels to the encoding means.

5. A method for enabling broadcast of multiple input audio channels, in lieu of picture information as conventionally contained in a TV video waveform, the method comprising the steps:
   sampling and time-compressing audio input signals from each channel and using the sampled-compressed signals to replace red, green and blue color video signals;
   combining the replaced signals to form a single carrier encoded composite signal;
   demodulating the encoded signal to restore the audio signal sample; and
   expanding the samples to resemble the multiple audio input signals.

* * * * *

UNITED STATES PATENT AND TRADEMARK OFFICE
CERTIFICATE OF CORRECTION

PATENT NO. : 4,656,512

DATED : April 7, 1987

INVENTOR(S) : Steven Devino

It is certified that error appears in the above-identified patent and that said Letters Patent is hereby corrected as shown below:

Column 1, line 59, change "1A" to --2A--.

Column 3, line 33, change "references" to --reference--.

Column 4, line 59, change "lock" to --clock--.

Signed and Sealed this

Eighth Day of September, 1987

Attest:

DONALD J. QUIGG

Attesting Officer

Commissioner of Patents and Trademarks